(12) United States Patent
Lauffenburger et al.

(10) Patent No.: US 7,161,586 B2
(45) Date of Patent: Jan. 9, 2007

(54) METHOD OF OPERATING AN OPTICAL MOTION SENSING DEVICE AND OPTICAL MOTION SENSING DEVICE IMPLEMENTING THIS METHOD

(75) Inventors: James Harold Lauffenburger, Colorado Springs, CO (US); Gil Afriat, Colorado Springs, CO (US); Robert R. Rotzoll, Green Mountain Falls, CO (US)

(73) Assignee: EM Microelectronic-Marin SA, Marin (CH)

( * ) Notice: Subject to any disclaimer, the term of this patent is extended or adjusted under 35 U.S.C. 154(b) by 326 days.

(21) Appl. No.: 10/609,687

(22) Filed: Jul. 1, 2003

(65) Prior Publication Data

US 2005/0001153 A1    Jan. 6, 2005

(51) Int. Cl.
*G09G 5/08* (2006.01)
*G09G 5/00* (2006.01)
*H01L 31/14* (2006.01)

(52) U.S. Cl. ............... 345/166; 345/175; 345/179; 250/553

(58) Field of Classification Search ........ 345/156–159, 345/161–167, 173–176, 179–183; 715/856–859; 178/18.01, 18.03, 18.09, 18.11, 19.05; 250/552, 250/553
See application file for complete search history.

(56) References Cited

U.S. PATENT DOCUMENTS

| | | | |
|---|---|---|---|
| 5,117,100 A * | 5/1992 | Yoshida et al. ............ 250/221 |
| 5,288,993 A | 2/1994 | Bidiville et al. |
| 5,367,130 A | 11/1994 | Isono |
| 5,578,813 A | 11/1996 | Allen et al. |
| 5,578,817 A * | 11/1996 | Bidiville et al. ............ 250/221 |
| 5,644,139 A * | 7/1997 | Allen et al. ................. 250/557 |
| 5,703,356 A | 12/1997 | Bidiville et al. |
| 5,825,044 A * | 10/1998 | Allen et al. ................. 250/557 |
| 5,854,482 A * | 12/1998 | Bidiville et al. ............ 250/221 |
| 6,005,681 A * | 12/1999 | Pollard ....................... 358/473 |
| 6,124,587 A * | 9/2000 | Bidiville et al. ............ 250/221 |
| 6,218,659 B1 * | 4/2001 | Bidiville et al. ............ 250/221 |
| 6,249,603 B1 * | 6/2001 | Rucklidge .................. 382/169 |
| 6,281,882 B1 | 8/2001 | Gordon et al. |
| 6,433,780 B1 * | 8/2002 | Gordon et al. ............. 345/166 |
| 6,455,840 B1 * | 9/2002 | Oliver et al. ............ 250/222.1 |
| 6,657,184 B1 * | 12/2003 | Anderson et al. .......... 250/221 |

(Continued)

FOREIGN PATENT DOCUMENTS

WO    WO 03/049018 A1    6/2003

Primary Examiner—Bipin Shalwala
Assistant Examiner—Jeff Piziali
(74) Attorney, Agent, or Firm—Sughrue Mion, PLLC

(57) ABSTRACT

There is described a method of operating an optical motion sensing device comprising a light source and a photodetector device, the method comprising the steps of a) illuminating a surface portion with radiation by means of the light source, b) detecting radiation reflected from the illuminated surface portion by means of the photodetector device, c) detecting and measuring displacement with respect to the illuminated surface portion; and d) outputting motion reports that are each representative of a magnitude of the detected displacement, steps a) to d) defining a flash period and being repeated at a selected flash rate. The method further comprises the steps of e) comparing the magnitude of the detected displacement with a determined displacement threshold, and f) increasing or decreasing the flash rate if the magnitude of the detected displacement is respectively greater or lower than the displacement threshold. There is also described an optical motion sensing device implementing this method.

23 Claims, 6 Drawing Sheets

U.S. PATENT DOCUMENTS

| | | |
|---|---|---|
| 6,665,439 B1 * | 12/2003 | Takahashi .................. 382/199 |
| 6,713,752 B1 * | 3/2004 | Oliver et al. ............... 250/221 |
| 2002/0185617 A1 | 12/2002 | Oliver et al. |
| 2003/0020688 A1 | 1/2003 | Norskog et al. |
| 2003/0075674 A1 | 4/2003 | Anderson et al. |
| 2003/0102425 A1 | 6/2003 | Rotzoll et al. |
| 2003/0103037 A1 | 6/2003 | Rotzoll et al. |

* cited by examiner

Output Motion vs. Input Motion
(expressed as fraction of pixel pitch)

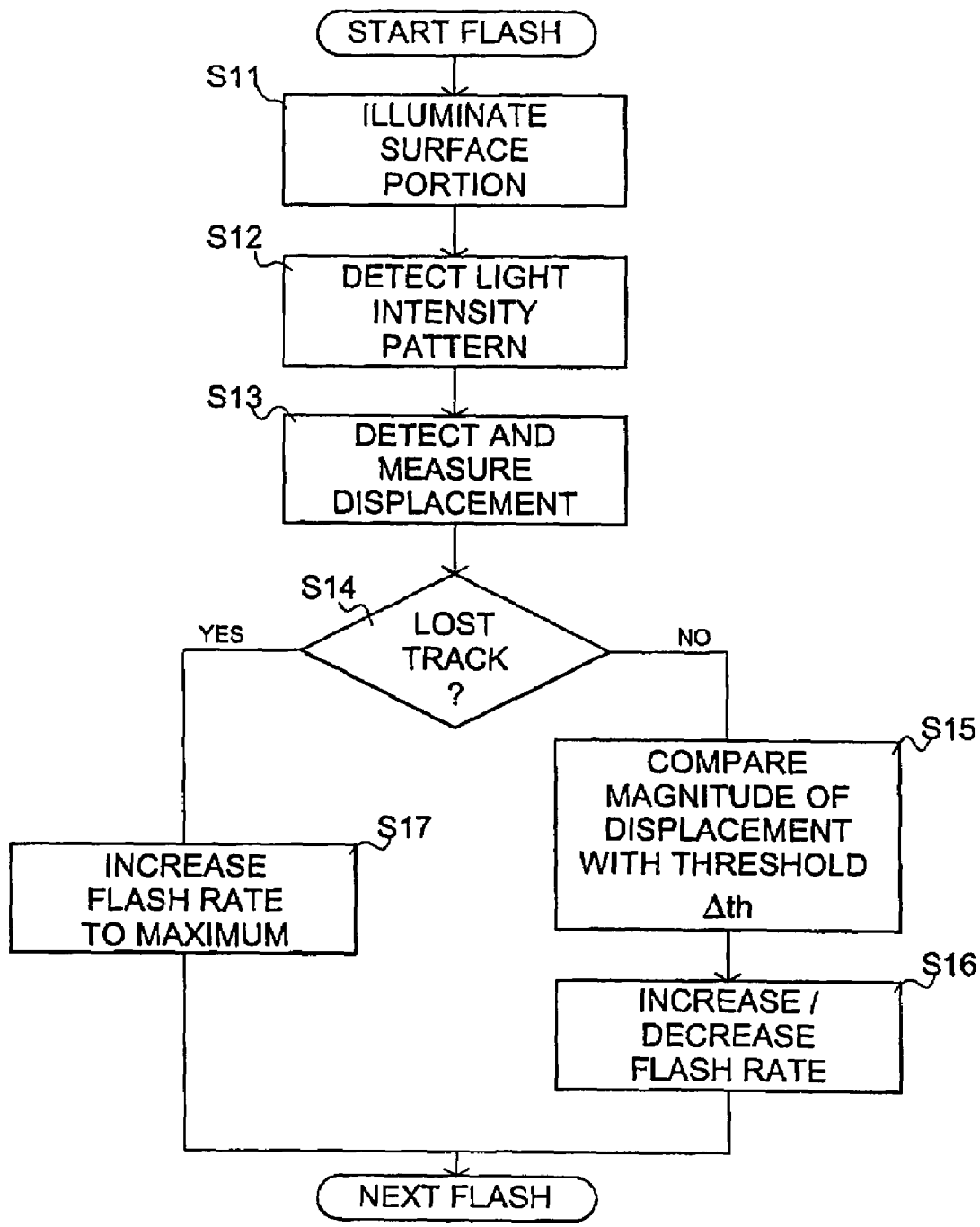

METHOD OF OPERATING AN OPTICAL MOTION SENSING DEVICE AND OPTICAL MOTION SENSING DEVICE IMPLEMENTING THIS METHOD

FIELD OF THE INVENTION

The present invention generally relates to optical motion sensing devices, in particular for use in optical pointing devices. The present invention more particularly relates to a method of operating an optical motion sensing device as well as an optical motion sensing device implementing this method.

BACKGROUND OF THE INVENTION

Optical pointing devices are already known in the art. U.S. Pat. No. 5,288,993 for instance discloses a cursor pointing device utilizing a photodetector array and an illuminated target ball having randomly distributed speckles. U.S. Pat. No. 5,703,356 (related to the above-mentioned U.S. Pat. No. 5,288,993) further discloses (in reference to FIGS. 23A and 23B of this document) an optical cursor pointing device in the form of a mouse which does not require a ball and wherein light is reflected directly from the surface over which the pointing device is moved.

In both cases, the optical pointing device includes a light source for repetitively illuminating a surface portion (i.e. a surface portion of the ball or a portion of the surface over which the optical pointing device is moved) with radiation and an optical sensing unit comprising a photodetector array including a plurality of pixels each having a photosensitive element which is responsive to radiation reflected from the illuminated surface portion. The pixels outputs of the photodetector array are typically coupled to conditioning and processing circuits for tracking and extracting information about the relative motion between the sensing unit and the illuminated surface portion.

The technique used in above-cited U.S. Pat. Nos. 5,288,993 and 5,703,356 in order to extract motion-related information is based on a so-called "Edge Motion Detection" technique. This "Edge Motion Detection" technique essentially consists in a determination of the movement of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

An improved motion detection technique based on the above "Edge Motion Detection" technique is the subject matter of a pending international application No. PCT/EP 02/13686 filed on Dec. 3, 2002 (under priority of U.S. provisional application No. 60/335,792 of Dec. 5, 2001) in the name of EM Microelectronic-Marin SA and entitled "Method and sensing device for motion detection in an optical pointing device, such as an optical mouse" (published as International Application No. WO 03/049018 A1). The above international application describes various motion detection algorithms which are all based on a common basic assumption, i.e. that motion of the sensor with respect to the illuminated surface between two successive measurements is less than the pixel pitch, i.e. the spacing between adjacent pixels of the photodetector array.

Besides this algorithm assumption, non-linearity in the displacement detection curve is expected as shown in the graph of FIG. 1. This graph shows the motion detected by the sensor versus input (or "real") motion, input motion being parallel to axis x in this example (input motion along axis y is zero). The input motion range is from 0 to 1 pixel pitch (1 in the graph of FIG. 1 means 1 pixel pitch). The targeted sensor output is shown by curve "a", while curves "b" and "c" respectively show the sensor's outputs for motion along axis x and axis y.

FIG. 1 shows that as the input motion goes up (displacement speed increases) the detected motion and the output gain (i.e. the ratio between the detected motion and the input motion) go down. This kind of behaviour causes the gain (i.e. motion reported vs. real motion) to be a function of the sensor speed. The higher the speed, the larger the displacement between the sensor flashes and the lower the gain. This dependency is highly not desirable.

Another problem is that the gain curve shown in FIG. 1 changes for different surfaces. A different surface gain response is for example shown in FIG. 2, input motion being again parallel to axis x in this second example. There thus also exists a dependency of the gain on the surface, which is also not desirable.

A solution is thus required for compensating the non-linearity in the displacement detection curve of the above optical motion sensing device.

SUMMARY OF THE INVENTION

According to a first aspect of the invention, there is provided a method of operating an optical motion sensing device comprising a light source and a photodetector device, the method comprising the steps of a) illuminating a surface portion with radiation by means of the light source, b) detecting radiation reflected from the illuminated surface portion by means of the photodetector device, c) detecting and measuring displacement with respect to the illuminated surface portion, and d) outputting motion reports that are each representative of a magnitude of the detected displacement, steps a) to d) defining a flash period and being repeated at a selected flash rate, wherein the method further comprises the steps of e) comparing the magnitude of the detected displacement with a determined displacement threshold, and f) increasing or decreasing the flash rate if the magnitude of the detected displacement is respectively greater or lower than the displacement threshold.

According to one embodiment, the photodetector device includes an array of photosensitive elements exhibiting a determined pixel pitch and the outputted motion reports are each representative of a displacement magnitude which is a fraction of the pixel pitch. The displacement threshold is preferably selected to be a low fraction of the pixel pitch, advantageously within a range of 0.06 times the pixel pitch to 0.25 times the pixel pitch.

According to another embodiment, the photodetector device includes an array of photosensitive elements and the step of outputting motion reports includes outputting a first motion report representative of the magnitude of a first component of the detected displacement along a first axis of displacement and outputting a second motion report representative of the magnitude of a second component of the detected displacement along a second axis of displacement, the flash rate being increased if either the magnitude of the first component of the detected displacement or the magnitude of the second component of the detected displacement is greater than the displacement threshold, the flash rate being decreased if both the magnitude of the first component of the detected displacement and the magnitude of the second component of the detected displacement are lower than the displacement threshold.

According to still another embodiment, the method further includes the step of detecting occurrence of a loss-of-tracking event indicating that track of the displacement has been lost, the flash rate being increased, preferably directly to a maximum, in order to regain track of the displacement if occurrence of the loss-of-tracking indication is detected. An extrapolation scheme may be provided for compensating for the displacement lost during the flash period where occurrence of the loss-of-tracking indication was detected.

Advantageous embodiments and variants are the subject-matter of the dependent claims.

According to a second aspect of the invention, there is provided an optical motion sensing device implementing the above method.

Other aspects, features and advantages of the present invention will be apparent upon reading the following detailed description of non-limiting examples and embodiments made with reference to the accompanying drawings.

BRIEF DESCRIPTION OF THE DRAWINGS

FIG. 6 is a flow chart illustrating an improved implementation of a method of operating the motion sensing device of FIG. 5.

DETAILED DESCRIPTION OF THE INVENTION

Figure 3:
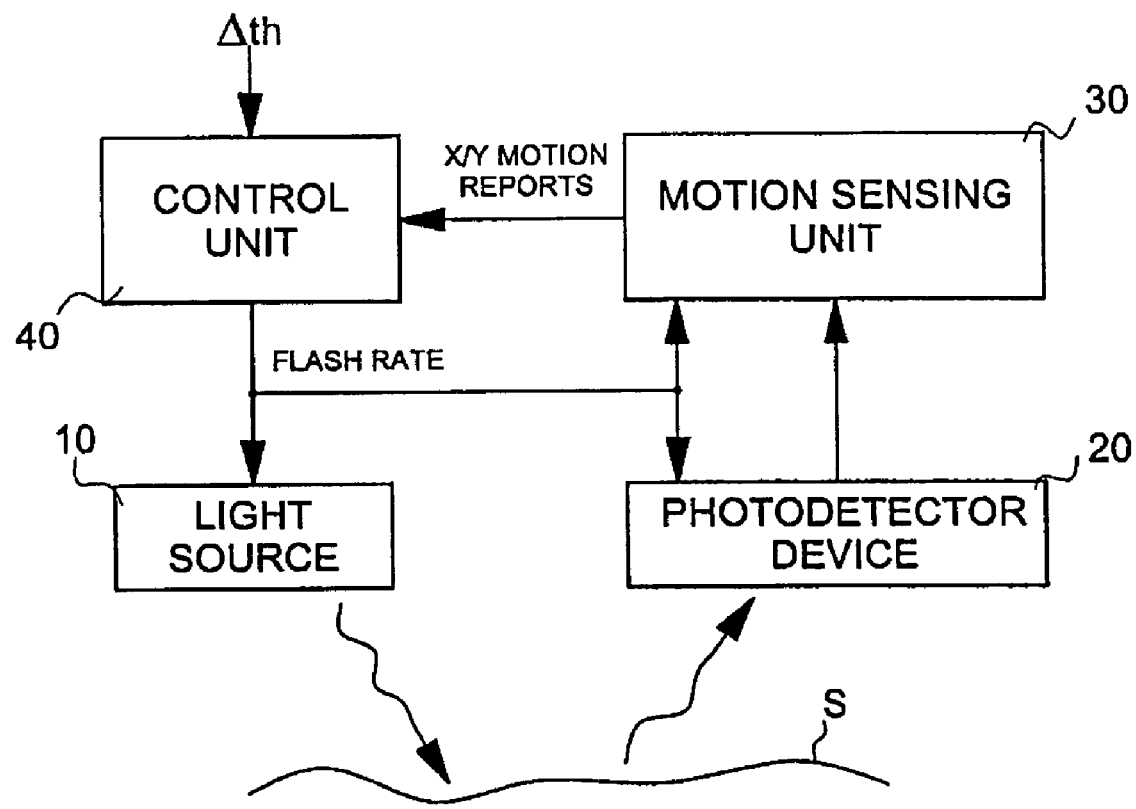
FIG. 3 is a diagram illustrating the basic principle of the invention.

FIG. 3 illustrates the basic principle of the invention. It basically consists of an optical sensing system comprising a light source 10 for illuminating a portion of a surface S with radiation, a photodetector device 20 having at least one photosensitive element responsive to radiation reflected from the illuminated surface portion S, and a motion sensing unit 30, coupled to the output of photodetector device 20, for detecting and measuring displacement with respect to the illuminated surface portion S. During each period of activation, or flash, light source 10 is activated to illuminate the surface portion S, photodetector device 20 is activated to capture an image or intensity pattern of the illuminated surface portion S and motion sensing unit 30 is activated to detect and measure the displacement with respect to the illuminated surface portion S based on a comparison of the intensity pattern detected by photodetector device 20 and a previous intensity pattern detected by photodetector device 20 during a previous flash period.

Within the scope of the present invention, the rate at which activation of light source 10, photodetector device 20 and motion sensing unit 30 is repeated will be defined as the "flash rate". It shall however be appreciated that light source 10, photodetector device 20 and motion sensing unit 30 are operated according to determined sequences and timings and that the so-called "flash rate" is not, strictly speaking, representative of the duration of activation of each of these components. The duration of activation of these components is typically less than the duration of each repetition period.

Motion sensing unit 30 outputs motion reports that are each representative of a magnitude of the detected displacement. More particularly, in case the sensor is adapted for two-axis motion detection (photodetector device 20 being a two-dimensional photodetector array), motion sensing unit 30 outputs during each flash a first motion report representative of the magnitude of a first component of the detected displacement along a first axis of displacement (axis x) and a second motion report representative of the magnitude of a second component of the detected displacement along a second axis of displacement (axis y). Those two axes of displacement are defined as the two axes of the photodetector array.

According to the invention, the motion sensing device further comprises a control unit, designated by reference numeral 40 in FIG. 3, which purpose is to adjust the flash rate (i.e. the rate of activation of light source 10, photodetector device 20 and motion sensing unit 30) as a function of the magnitude of the detected displacement. The motion reports from motion sensing unit 30 are thus fed to control unit 40 to provide a basis and reference for performing this adjustment of the flash rate.

More particularly, control unit 40 is adapted to compare the magnitude of the detected displacement with a determined displacement threshold, designated $\Delta th$, and increase or decrease the flash rate if the magnitude of the detected displacement is respectively greater or lower than the displacement threshold $\Delta th$. Accordingly, if the displacement reported by the sensor is larger than the displacement threshold, the flash rate is increased (i.e. the time between flashes decreases) and if this reported displacement is lower than the threshold, the flash rate is decreased (i.e. the time between flashes increases). This way, the motion sensing device is commanded so that the input displacement is kept around the displacement threshold $\Delta th$, as long as the displacement speed and acceleration are kept within normal operating ranges.

Figure 4:
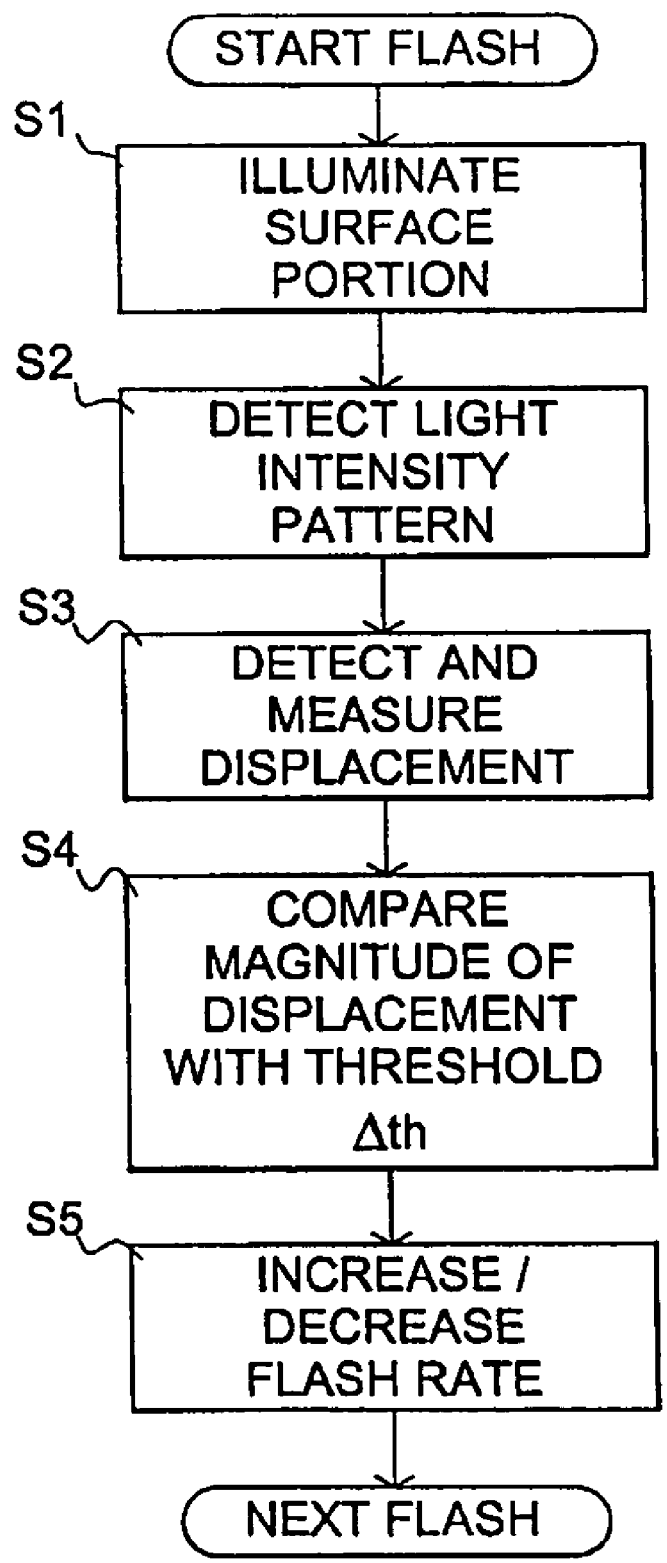
FIG. 4 is a flow chart showing the basic operations of the optical motion sensing device within the scope of the invention

The basic principle of operation of the motion sensing device is summarized in FIG. 4 where steps S1 to S5 respectively designate the steps of (i) illuminating surface portion S by means of light source 10, (ii) detecting the light intensity pattern reflected from surface portion S by means of photodetector device 20, (iii) detecting and measuring the displacement with respect to the illuminated surface portion, (iv) comparing the magnitude of the detected displacement with the displacement threshold $\Delta th$, and (v) increasing or decreasing the flash rate if the magnitude of the detected displacement is respectively greater or lower than the displacement threshold.

Motion sensing unit 30 advantageously operates according to the motion detection principles described in international application No. PCT/EP 02/13686 (WO 03/049018 A1) mentioned hereinabove which is incorporated herein by reference in its entirety. As already mentioned a common basic assumption of these motion detection principles is that motion of the sensor with respect to the illuminated surface between two successive measurements is less than the pixel pitch, i.e. the spacing between adjacent pixels of the photodetector array. In other words, the motion reports outputted by motion sensing unit 30 are each representative of a magnitude of displacement which is a fraction of the pixel pitch, i.e. the reported displacement magnitude ranges from 0 to the pixel pitch. The displacement threshold Δth is thus also selected to correspond to a determined fraction of the pixel pitch.

Figure 1:
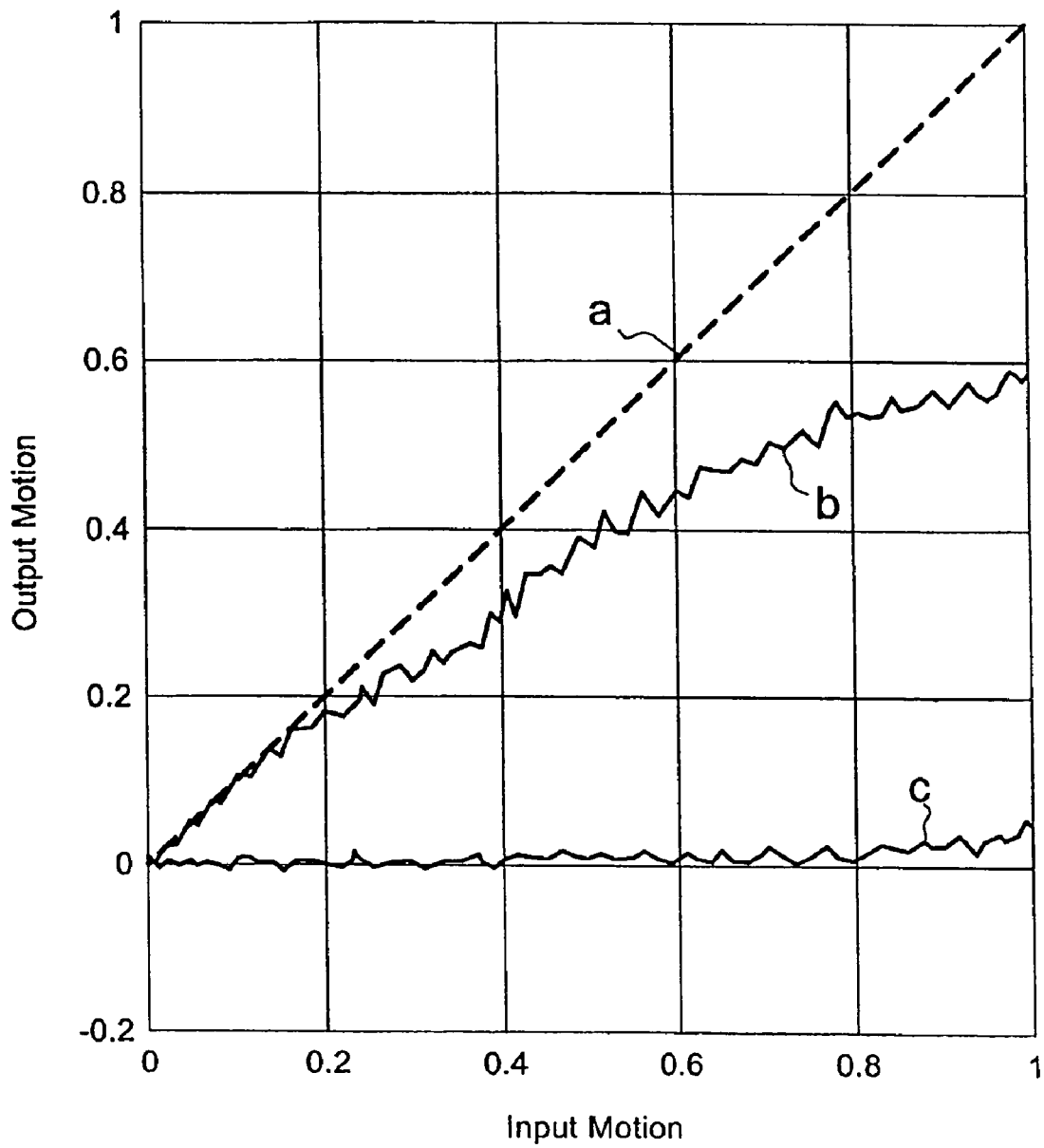
FIGS. 1 and 2 which have already been discussed are graphs illustrating the non-linearity in the displacement detection curve of the optical motion sensing device.
Figure 2:
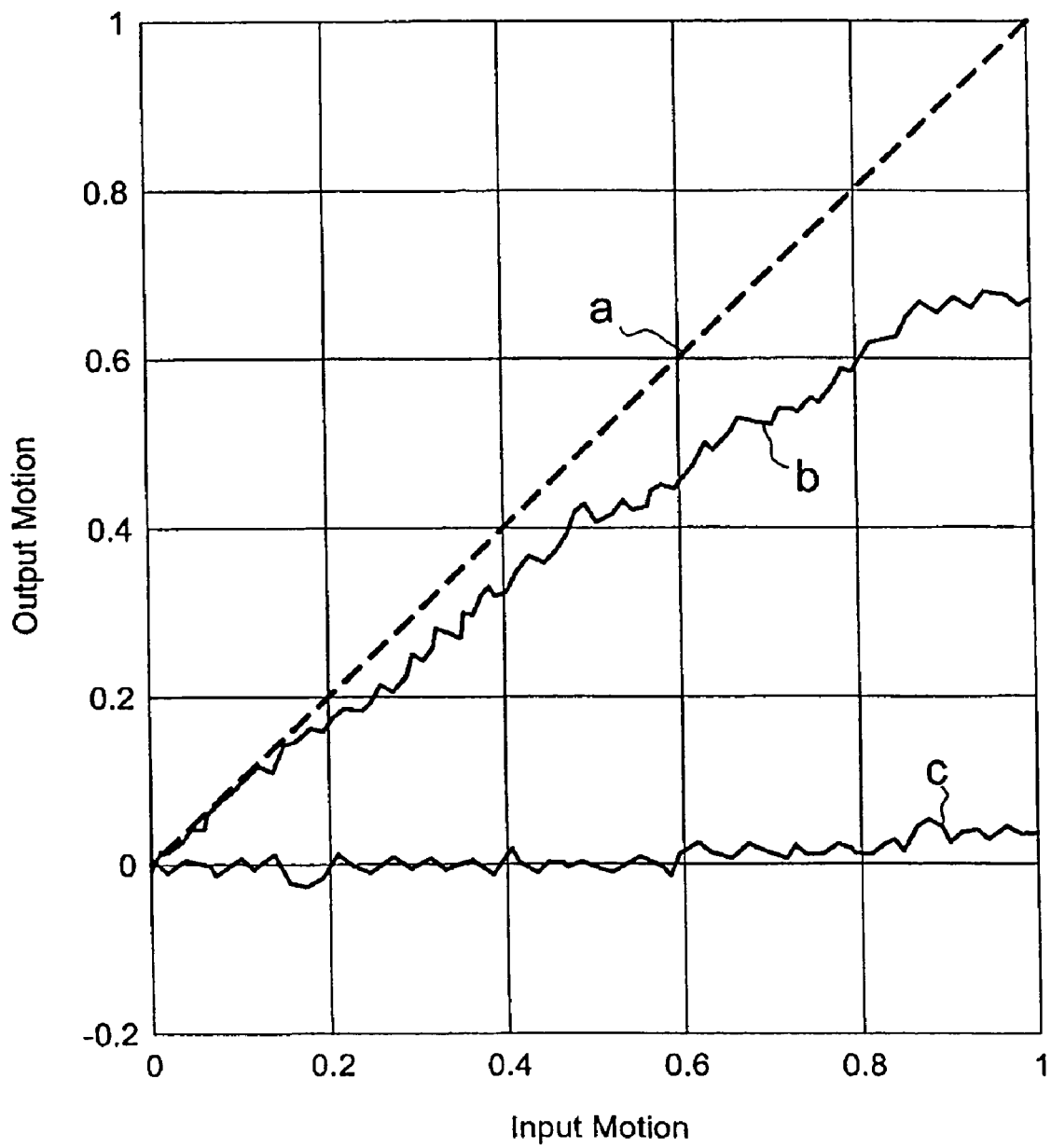

Referring again to the graphs of FIGS. 1 and 2, the displacement threshold Δth is preferably selected to be at the lower range of output displacement. A practical setting for displacement threshold Δth is within a range from 0.06 times the pixel pitch to 0.25 times the pixel pitch. Selecting a low fraction of the pixel pitch for the displacement threshold Δth will keep the sensor away from the one pixel pitch upper displacement limit where the non-linearity is the highest. This lower setting of the displacement threshold Δth will also keep a fairly high and constant gain vs. speed. As displacement speed changes, the flash rate will change and the sensor will "see" substantially the same input displacement. One will also appreciate that for low input displacement, the motion gain (detected motion vs. input motion) is closer to 1.

Another benefit of the above flash rate control principle is that the gain will be fairly constant vs. surface as for most surfaces the gain at lower input displacement is fairly the same.

The flash rate increment and decrement steps should be chosen so that the algorithm will be fast enough to track the sensor varying displacement speed. A simple choice may be to increment the flash rate by doubling it at each step (thereby cutting the time between two flash periods by two) and to decrement the flash rate by dividing it by two (doubling the time between two flash periods).

Maximum and minimum limits should be set for the flash rate. The maximum limit should be a function of the maximum speed and power specifications of the motion sensing device (bearing in mind that power goes up with the flash rate). The minimum limit is usually reached when the sensor is not moving and should be a function of power dissipation at rest, minimum required detected displacement and response time to start up (i.e. when the sensor starts moving). With the scope of a particular and non limiting implementation, the flash rate will for instance be kept between 20 Hz and 10 kHz.

Preferably, in case the motion sensing device is adapted for two-axis motion detection, the above flash rate control algorithm takes the approach of logical OR between reported x displacement and y displacement to increase the flash rate. More particularly, if either x displacement or y displacement is larger that the displacement threshold Δth the flash rate is increased. Only if both x displacement and y displacement are lower than the displacement threshold Δth the flash rate is decreased. This approach ensures that the motion sensing device is keeping up with the faster moving axis.

Within the scope of a particular embodiment of the invention, the motion sensing device is preferably adapted to operate according to the so-called "Peak/Null Motion Detection" algorithm (or "Edge Inflection Motion Detection") described in international application No. PCT/EP 02/13686 (WO 03/049018 A1) which is incorporated herein by reference. A detailed description and explanation of this motion detection principle may be found in the above international application and we will not describe it again. We will briefly enumerate the basic features of this motion detection algorithm with reference to the illustration of FIG. 5.

Figure 5:
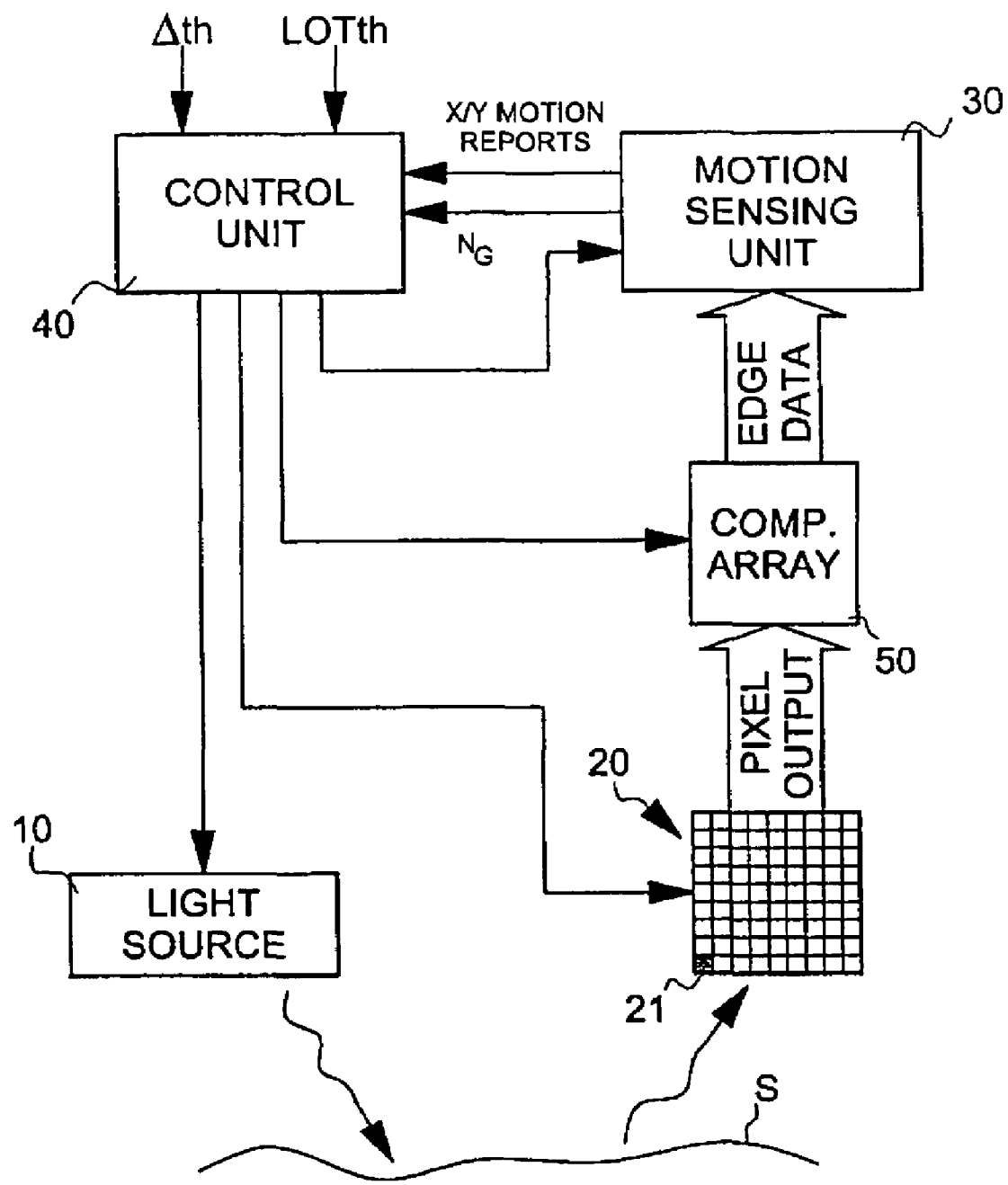
FIG. 5 is a schematic illustration of a preferred embodiment of an optical motion sensing device according to the invention.

FIG. 5 is basically similar to FIG. 3 and shows the light source 10, the photodetector device 20, the motion sensing unit 30 and the control unit 40. The motion sensing device of FIG. 5 additionally includes a comparator array 50 which is coupled between the photodetector device 20 and the motion sensing unit 30. This comparator array 50, the function of which is already described in international application No. PCT/EP 02/13686 (WO 03/049018 A1), is used to extract so-called edge direction data from the intensity pattern detected by the photodetector array 20, i.e. data that is descriptive of light intensity differences between neighbouring pixels of the photodetector array (a pixel designates one photosensitive element of the photodetector array).

A first step of the motion detection algorithm is, as already mentioned in connection with the comparator array 50 of FIG. 5, to compare light intensity between neighbouring pixels of the photodetector array 20 in order to extract edge direction data therefrom. It shall be recalled, as described in the above international application, that edge direction data includes two types of edge direction conditions, namely a first edge condition, or positive edge, defined as a condition wherein the light intensity of a first pixel is less than the light intensity of a second pixel, and a second edge condition, or negative edge, defined as a condition wherein the light intensity of the first pixel is greater than the light intensity of the second pixel. Such edge direction conditions are defined between every pair of neighbouring pixels (not necessarily adjacent) of the photodetector array 20 and are determined, as already mentioned, thanks to the comparator array 50 which basically consists of a set of comparator circuits coupled to corresponding pairs of pixels within array 20.

This edge direction data is fed by comparator array 50 to the motion sensing unit 30 for further processing. In particular, according to the "Peak/Null Motion Detection" algorithm, so-called edge inflection data is extracted from the edge direction data supplied by comparator array 50, this edge inflection data being descriptive of the succession of positive and negative edges along the first or second axis of the photodetector array and include a first inflection condition, or peak, defined as the succession, along the first or second axis, of a positive edge followed by a negative edge, and a second inflection condition, or null, defined as the succession, along the first or second axis, of a negative edge followed by a positive edge.

In contrast to the previously mentioned edge direction data, an inflection condition, whether a peak or a null, does not appear systematically between two successive edge conditions. Besides peaks and nulls there also exist states where the direction of the detected edge does not change when looking at the succession of two edge conditions along one or the other axis of displacement.

According to the "Peak/Null Motion Detection" algorithm, motion is tracked by looking at the displacement of the edge inflection conditions between two successive flashes. The locations of the peaks and nulls are thus compared with the locations of the peaks and nulls detected from a previous flash in order to determine the direction and magnitude of displacement. It is worth mentioning again that the displacement is determined by comparing the location of each peak or null determined from a first flash with the locations, in the immediate vicinity, of similar peaks and nulls determined from another flash, i.e. locations that are within one pixel pitch of the detected peak or null. The result of the calculation is an indication of the direction and magnitude of displacement, along each axis of displacement, expressed as a fraction of the pixel pitch.

The "Peak/Null Motion Detection" approach has several advantages that are listed in the above-mentioned international application, one of which is the ability to provide an indication of whether or not the sensor is keeping track of the displacement, i.e. whether or not the input displacement is effectively less than the pixel pitch as assumed. A "loss-of-tracking" event may occur if the sensor displacement speed is too great or if the sensor acceleration is too high, and may be identified, thanks to the "Peak/Null Motion Detection" approach, by looking at the number of so-called "ghost edge inflection conditions", i.e. edge inflection conditions that appear to come from nowhere. These "ghost edge inflection conditions" are identified as edge inflection conditions determined during a flash for which no similar edge inflection condition determined during another flash can be found at the same location or one pixel pitch around it. The number of these "ghost edge inflection conditions" can be tracked for both axes and compared to a determined threshold. If the number exceeds the threshold, this can be identified as a loss-of-tracking event. The threshold will thus be defined hereinafter as the "loss-of-tracking threshold" and designated as LOTth.

In FIG. 5, the motion sensing unit 30 is thus illustrated as supplying an additional parameter, designated $N_G$, to control unit 40, which parameter relates to the number of ghost edge inflections found during motion detection. Control unit 40 is also further adapted to compare this number $N_G$ with threshold LOTth and further increase the flash rate if the loss-of-tracking event occurs (when reported number $N_G$ is greater than threshold LOTth).

When a loss-of-tracking event occurs, which situation should be regarded as exceptional, the flash rate is preferably increased directly to a maximum value in order to quickly regain track of the displacement. One will of course understand that, if the displacement speed is above the specified maximum speed that the sensor can detect, track of the displacement will be lost and will not be regained even after setting of the flash rate to its maximum value. If the flash rate is set at its maximum value and the loss-of-tracking event continues to occur, then this will definitely be considered to be indicative that the sensor cannot anymore keep up with the displacement.

The loss-of-tracking event may also occur if the sensor is accelerating in such a rate that the above-mentioned flash rate control algorithm cannot keep up with it and the displacement between two flashes becomes larger than one pixel pitch. By increasing the flash rate directly to its maximum (or at a rate which is substantially higher than the rate at which the flash rate is normally increased), the sensor should immediately regain track of the displacement and the detected displacement should be less than the pixel pitch, provided that the instantaneous speed of displacement of the sensor remains below the sensor maximum allowed speed of displacement.

It the maximum flash rate is too high for the sensor motion, i.e. detected displacement is too low and falls below the displacement threshold Δth, control unit 40 will again decrease the flash rate during subsequent flashes to adjust it to the "optimum" or "operational" flash rate. This decrease will happen very fast, as falling from high flash rate (shorter time between flashes) to a lower one is much faster than climbing up.

FIG. 6 is a flow chart schematically illustrating a sequence of operations implementing the above acceleration handling algorithm. The flow chart of FIG. 6 is basically similar to that of FIG. 4, steps S11, S12, S13, S15 and S16 respectively corresponding to steps S1 to S5 of FIG. 4. The sequence of operations of FIG. 6 additionally includes a step (S14) where it checked if track of the displacement has been lost by the sensor (based for instance of the number of detected ghost edge inflection conditions). If track of the displacement is lost, the flash rate is increased to its maximum value at step S17 as explained hereinabove.

Not implementing the above acceleration handling algorithm and letting the aforementioned flash rate control algorithm to step up the flash rate in case of occurrence of a loss-of-tracking event is possible but might not be enough because the flash rate increase will be too slow and a relatively long time might pass before the sensor regains track of the displacement, and because the flash rate control algorithm relies on the reported displacement to increase or decrease the flash rate. If the sensor loses track of the displacement, its reported displacement is not reliable and may be artificially low even if the input displacement is very large.

Besides the just mentioned acceleration handling algorithm, a displacement compensation algorithm might be provided. During the flash period in which the sensor loses track of the displacement, the displacement detected by the motion sensing device is not reliable and should be discarded. In order to compensate for this lost displacement, the displacement reported by the motion sensing device after the flash rate as been increased and track of the displacement has been regained can be used and be extrapolated for the time of the lost displacement. Different compensation algorithms with different schemes may be used as which reported displacement (the first after flash rate is set to maximum or the first after the flash rate control algorithm finds the "operational" flash rate, etc.) and how many displacement reports (one or an average of several) are used for the lost displacement extrapolation and what kind of extrapolation (linear, non-linear, etc.) is used.

In addition to the flash rate increase, upon occurrence of a loss-of-tracking event, the acceleration handling algorithm should preferably address another issue, namely adjustment of the loss-of-tracking threshold LOTth. This threshold should be optimized and adjusted "on the fly" as its optimum level changes with the surface, displacement and surface picture. Preferably, because a loss-of-tracking event should be a rare one, threshold LOTth should be increased by one for each occurrence of a loss-of-tracking event (assuming that if this event occurs, it might be that the threshold is too low) and should be decreased by one for each N successive flashes without any loss-of-tracking event. The assumption behind the threshold decrement is that if N flashes have passed without a loss-of-tracking event it might be that the threshold is too high. The asymmetry between LOTth increment and decrement (one loss-of-tracking event vs. N events) is needed because loss-of-tracking events are more rare (and should be so) than non-loss-of-tracking events. A good number for N is between 40 and 100.

It might also help to add minimum and maximum limits on the loss-of-tracking threshold LOTth, as during rest the threshold might otherwise drop to zero, which is not desirable, and on some surfaces might go too high, thereby affecting the sensor loss-of-tracking sensitivity for high acceleration. Reasonable values for maximum and minimum limits for threshold LOTth are 25 and 5 for a 20×20 pixel array. It should be noted that these limits are dependent on the pixel array size (the larger the array is, the higher the average ghost inflection count gets). For a 30×30 pixel array, the maximum limit might for example be increased to 60.

The above algorithm for incrementing and decrementing the loss-of-tracking threshold will try to keep the threshold at an optimal point so that the sensor will have a high probability to report a loss-of-tracking event when displacement is larger than one pixel pitch (sensor is accelerating too strongly) and not report such an event when displacement is lower than one pixel pitch. Of course, the lower the displacement is the lower is the probability that the sensor will report a loss-of-tracking event.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, in the embodiment of FIG. 5, detection of the occurrence of loss-of-tracking events is shown to be performed by control unit 40, motion sensing unit 30 providing to control unit 40 the number $N_G$ of detected ghost edge inflection conditions. Such detection may alternatively be embedded in motion sensing unit 30. In such case, motion sensing unit 30 would simply provide to control unit 40 an indication of the occurrence or non-occurrence of a loss-of-tracking event so as to allow appropriate adjustment of the flash rate. Adjustment of the loss-of-tracking threshold LOTth would similarly be embedded in motion sensing unit 30 directly.

In general, each of the above-mentioned functions and features may be performed by specific-purpose units or by one or more multiple-purpose units. For instance, motion sensing unit 30 and control unit 40 might be merged into a single unit performing all of the above-functions. The subdivisions illustrated in FIGS. 3 and 5 should therefore be regarded as being solely functional.

What is claimed is:

1. A method of operating an optical motion sensing device comprising a light source and a photodetector device including an array of photosensitive elements exhibiting a determined pixel pitch, the method comprising the steps of:
    a) illuminating a surface portion with radiation by means of the light source;
    b) detecting radiation reflected from the illuminated surface portion by means of the photodetector device;
    c) detecting and measuring displacement with respect to the illuminated surface portion; and
    d) outputting motion reports that are each representative of a magnitude of the detected displacement which is a fraction of the pixel pitch,
        steps a) to d) defining a flash period and being repeated at a selected flash rate, wherein the method further comprises the steps of:
    e) comparing the magnitude of the detected displacement with a determined displacement threshold selected to be within a range of 0.06 times the pixel pitch to 0.25 times the pixel pitch; and
    f) increasing or decreasing the flash rate if the magnitude of the detected displacement is respectively greater or lower than the displacement threshold so that the detected displacement is kept around the displacement threshold.

2. The method of claim 1, wherein the flash rate is increased or decreased by respectively doubling it or dividing it by two.

3. The method of claim 1, wherein the flash rate is kept between a maximum and a minimum flash rate.

4. The method of claim 1, wherein the photodetector device includes an array of photosensitive elements and wherein the step of outputting motion reports includes outputting a first motion report representative of the magnitude of a first component of the detected displacement along a first axis of displacement and outputting a second motion report representative of the magnitude of a second component of the detected displacement along a second axis of displacement,
    the flash rate being increased if either the magnitude of the first component of the detected displacement or the magnitude of the second component of the detected displacement is greater than the displacement threshold,
    the flash rate being decreased if both the magnitude of the first component of the detected displacement and the magnitude of the second component of the detected displacement are lower than the displacement threshold.

5. The method of claim 1, further including the step of detecting occurrence of a loss-of-tracking event indicating that track of the displacement has been lost, the flash rate being increased if occurrence of the loss-of-tracking event is detected in order to regain track of the displacement.

6. The method of claim 5, wherein the flash rate is directly increased to a maximum if occurrence of the loss-of-tracking event is detected.

7. The method of claim 5, wherein the photodetector device includes a photodetector array including a plurality of pixels aligned along first and second axes and wherein said step b) of detecting radiation reflected from the illuminated surface portion includes detecting a light intensity pattern of the illuminated surface portion,
    said step c) of detecting and measuring displacement including:
        c1) comparing light intensity between neighbouring pixels of the photodetector array along both the first and second axes and determining edge direction data from the detected light intensity pattern, which data is descriptive of light intensity differences between said neighbouring pixels and includes:
        a first edge condition, or positive edge, defined as a condition wherein the light intensity of a first pixel is less than the light intensity of a second pixel; and
        a second edge condition, or negative edge, defined as a condition wherein the light intensity of the first pixel is greater than the light intensity of the second pixel;
        c2) extracting edge inflection data from said edge direction data, said edge inflection data being descriptive of a succession of positive and negative edges along the first or second axis of the photodetector array and including:
        a first inflection condition, or peak, defined as the succession, along said first or second axis, of a positive edge followed by a negative edge; and
        a second inflection condition, or null, defined as the succession, along said first or second axis, of a negative edge followed by a positive edge; and
        c3) determining a measurement of the displacement with respect to the illuminated surface portion based on a comparison of locations of said peaks and nulls determined from first and second light intensity patterns successively detected by said photodetector array,
    said step of detecting occurrence of the loss-of-tracking event including counting a number of peaks and/or nulls which do not originate from any neighbouring location or which do not correspond to previously detected peaks and/or nulls, the loss-of-tracking event being defined to have occurred if said number is greater than a determined loss-of-tracking threshold.

8. The method of claim 7, further including the step of adjusting a value of the loss-of-tracking threshold.

9. The method of claim 8, wherein said step of adjusting the value of the loss-of-tracking threshold includes incrementing the threshold by one each time occurrence of the loss-of-tracking event is detected and decrementing the threshold by one for each N successive flash periods without occurrence of the loss-of-tracking event.

10. The method of claim 9, wherein N is between 40 and 100.

11. The method of claim 8, wherein the loss-of-tracking threshold is kept between a minimum and maximum value.

12. The method of claim 5, wherein during the flash period where occurrence of the loss-of-tracking event is detected, the displacement detected and measured at step c) is discarded,
the method further comprising the step of compensating for the discarded displacement by extrapolating the displacement detected and measured after track of the displacement is regained.

13. The method of claim 12, wherein extrapolation of the detected displacement is based on the first displacement detected and measured after track of the displacement is regained.

14. The method of claim 12, wherein the flash rate is directly increased to a maximum if occurrence of the loss-of-tracking event is detected and wherein, after track of the displacement is regained following increase of the flash rate to a maximum, the flash rate is decreased until the magnitude of the detected displacement is greater than the displacement threshold,
extrapolation of the detected displacement being based on the displacement detected and measured during the flash period where the magnitude of the detected displacement is found to be greater than the displacement threshold.

15. An optical motion sensing device comprising:
a light source for illuminating a surface portion with radiation;
a photodetector device responsive to radiation reflected from the illuminated surface portion and including an array of photosensitive elements exhibiting a determined pixel pitch;
a motion sensing unit coupled to the photodetector device for detecting and measuring displacement with respect to the illuminated surface portion, the motion sensing unit being adapted to output motion reports that are each representative of a magnitude of the detected displacement, which is a fraction of the pixel pitch,
the light source, the photodetector and the motion sensing unit being operated during a defined flash period and at a selected flash rate,
wherein said optical motion sensing device further comprises a control unit for increasing or decreasing the flash rate as a function of the magnitude of the displacement detected by the motion sensing unit,
said control unit being adapted to compare the magnitude of the detected displacement with a determined displacement threshold being selected to be within a range of 0.06 times the pixel pitch to 0.25 times the pixel pitch, and increase or decrease the flash rate if the magnitude of the detected displacement is respectively greater or lower than the displacement threshold so that the detected displacement is kept around the displacement threshold.

16. The optical motion sensing device of claim 15, wherein the control unit is adapted to increase or decrease the flash rate by respectively doubling it or dividing it by two.

17. The optical motion sensing device of claim 15, wherein the control unit is adapted to keep the flash rate between a maximum and a minimum flash rate.

18. The optical motion sensing device of claim 15, wherein the photodetector device includes an array of photosensitive elements and wherein the motion sensing unit is adapted to output a first motion report representative of the magnitude of a first component of the detected displacement along a first axis of displacement and a second motion report representative of the magnitude of a second component of the detected displacement along a second axis of displacement,
the control unit being adapted to increase the flash rate if either the magnitude of the first component of the detected displacement or the magnitude of the second component of the detected displacement is greater than the displacement threshold,
the control unit being adapted to decrease the flash rate if both the magnitude of the first component of the detected displacement and the magnitude of the second component of the detected displacement are lower than the displacement threshold.

19. The optical motion sensing device of claim 15, further including means for detecting occurrence of a loss-of-tracking event indicating that the motion sensing unit has lost track of the displacement,
the control unit being adapted to increase the flash rate if occurrence of the loss-of-tracking event is detected in order to regain track of the displacement.

20. The optical motion sensing device of claim 19, wherein the control unit is adapted to increase the flash rate directly to a maximum if occurrence of the loss-of-tracking event is detected.

21. The optical motion sensing device of claim 19, wherein the photodetector device includes a photodetector array including a plurality of pixels aligned along first and second axes for detecting a light intensity pattern of the illuminated surface portion,
wherein the motion sensing unit includes:
comparator means for comparing light intensity between neighbouring pixels of the photodetector array along both the first and second axes and for determining edge direction data from the detected light intensity pattern, which data is descriptive of light intensity differences between said neighbouring pixels and includes:
a first edge condition, or positive edge, defined as a condition wherein the light intensity of a first pixel is less than the light intensity of a second pixel; and
a second edge condition, or negative edge, defined as a condition wherein the light intensity of the first pixel is greater than the light intensity of the second pixel;
means for extracting edge inflection data from said edge direction data, said edge inflection data being descriptive of the succession of positive and negative edges along the first or second axis of the photodetector array and including:
a first inflection condition, or peak, defined as the succession, along the first or second axis, of a positive edge followed by a negative edge; and
a second inflection condition, or null, defined as the succession, along the first or second axis, of a negative edge followed by a positive edge;
processing means for determining a measurement of relative motion with respect to the illuminated surface portion based on a comparison of locations of said peaks and nulls determined from first and second light intensity patterns successively detected by the photodetector array,
the means for detecting occurrence of the loss-of-tracking event including means for counting a number of peaks and/or nulls which do not originate from any neighbouring location or which do not correspond to previously detected peaks and/or nulls, the loss-of-tracking event being defined to have occurred if said number is greater than a determined loss-of-tracking threshold.

22. The optical motion sensing device of claim 21, further including means for adjusting the loss-of-tracking threshold.

23. The optical motion sensing device of claim 22, wherein the means for adjusting the loss-of-tracking threshold are adapted to increment the threshold by one each time the loss-of-tracking event is detected and decrement the threshold by one for each N successive flash periods without occurrence of the loss-of-tracking event.

* * * * *